United States Patent [19]
Chester

[11] 3,890,129
[45] June 17, 1975

[54] AEROBIC/ANAEROBIC COMPOSTING DEVICE AND METHOD OF COMPOSTING

[76] Inventor: Francis B. Chester, 220 East 42nd St., Bayside, N.Y. 10017

[22] Filed: Dec. 14, 1972

[21] Appl. No.: 315,115

[52] U.S. Cl............... 71/9; 23/259.1; 47/9; 71/10; 195/131; 259/89
[51] Int. Cl........................ C05f 11/08; C05f 11/06
[58] Field of Search............... 23/259.1, 286, 259.3; 71/8, 9, 10; 34/108, 134, 138; 195/131; 210/402, 403; 259/81 R, 89; 47/9

[56] References Cited
UNITED STATES PATENTS

| | | | |
|---|---|---|---|
| 1,872,024 | 8/1932 | Bates | 23/259.1 X |
| 3,248,175 | 4/1966 | Emmet | 71/9 X |

FOREIGN PATENTS OR APPLICATIONS

| | | | |
|---|---|---|---|
| 716,837 | 12/1931 | France | 34/108 |

*Primary Examiner*—Joseph Scovronek
*Assistant Examiner*—Arnold Turk
*Attorney, Agent, or Firm*—Hanse H. Hamilton

[57] ABSTRACT

An aerobic-anaerobic composting device and method of composting organic waste materials. The composting device disclosed is a free-standing rotatable wheel which has an open mesh material on its exterior sides and ends. After the organic waste material is placed in the wheel, a removable cover is placed over the open mesh material on the sides of the wheel and the wheel is rotated periodically to mix and aerate the contents with a tumbling action. The cover retains the material in the wheel and also protects it from the weather. Fertilizers or other chemicals of high nitrogen content may be added to the waste material in the wheel to promote its decomposition. After the composting has been completed, the cover is removed and the composted material is discharged by rotating the wheel.

For anaerobic treatment, the wheel is not rotated and a second cover is placed over the material in the wheel and the ends of the wheel are closed to restrict the flow of air. After such treatment, the inner and outer covers are removed and the contents of the wheel are discharged, as required, by rotation of the wheel.

3 Claims, 2 Drawing Figures

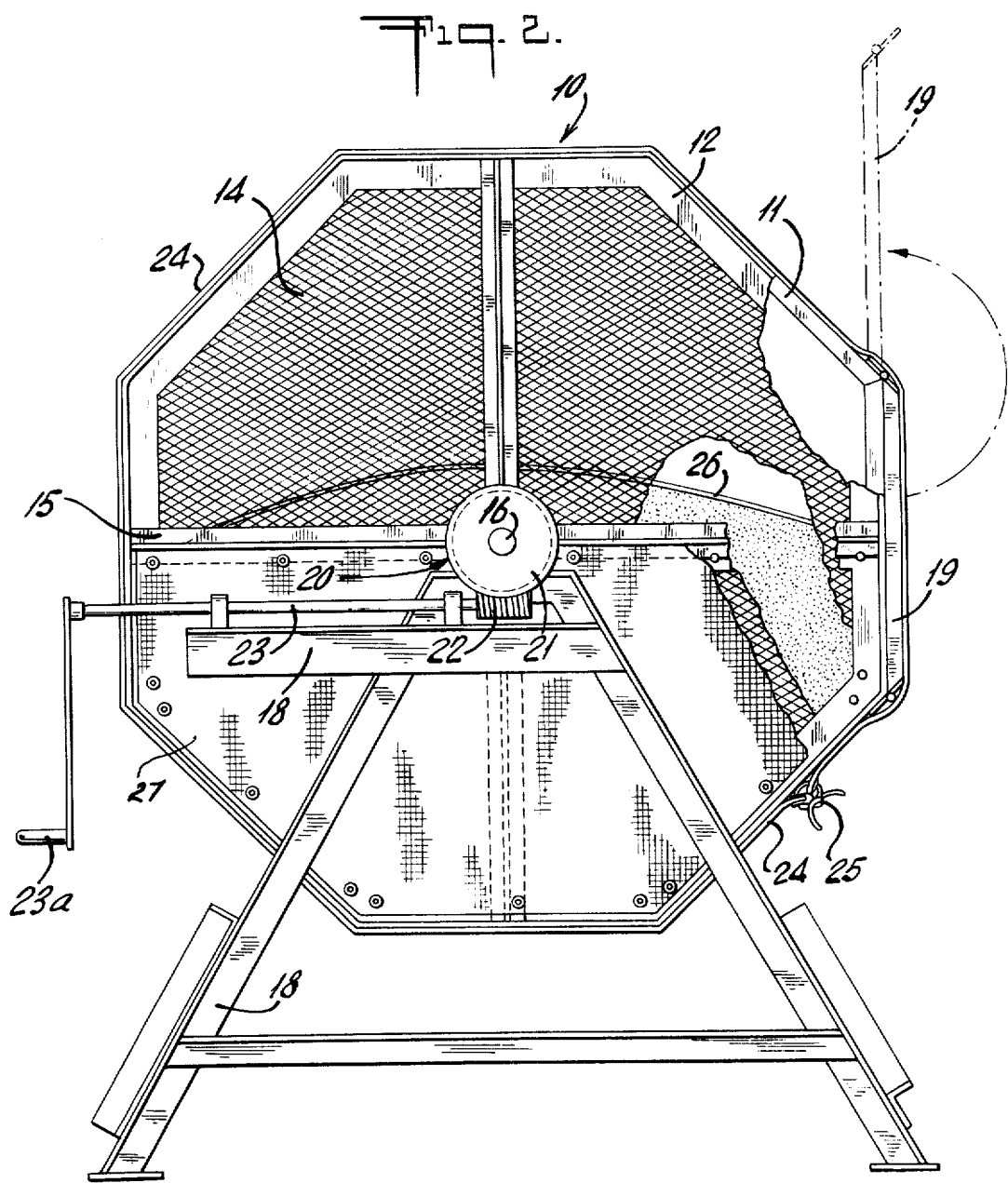

AEROBIC/ANAEROBIC COMPOSTING DEVICE AND METHOD OF COMPOSTING

The present invention relates to an aerobic/anaerobic composting device and a method of composting organic waste material. It relates, more particularly, to a rotatable container or wheel and a method of aerobic/anaerobic composting of organic waste material.

An object of the invention is to provide a composting device and method of composting which converts organic waste materials such as leaves, grass clippings, small twigs, household waste or the like into a usable substance in an effective and simple manner without the physical labor involved in layering and turning such material in a compost pile.

A further object of the invention is to provide a composting device and a method of composting which converts organic waste materials such as leaves, grass clippings or the like into a loose friable compost material consisting of small particles which is nutritious to the soil and can readily be applied in cultivation of the soil with beneficial results. The subject composting device permits the composting process to be carried out on a continuous basis if desired and permits home gardeners to convert organic waste material into a soil enriching substance at low cost.

Another object of the invention is to eliminate the burning of waste material and thus, reduce air pollution which is caused by such burning. In many localities, the burning of leaves and the like is prohibited by law and the present invention is particularly useful because it converts such waste materials into useful material without burning or producing smoke.

Further objects and advantages of the invention will be better understood and will become apparent from the following description and the accompanying drawing, in which:

FIG. 2 is an end view of the composting device shown in FIG. 1 with portions broken away for clarity.

Figure 1:
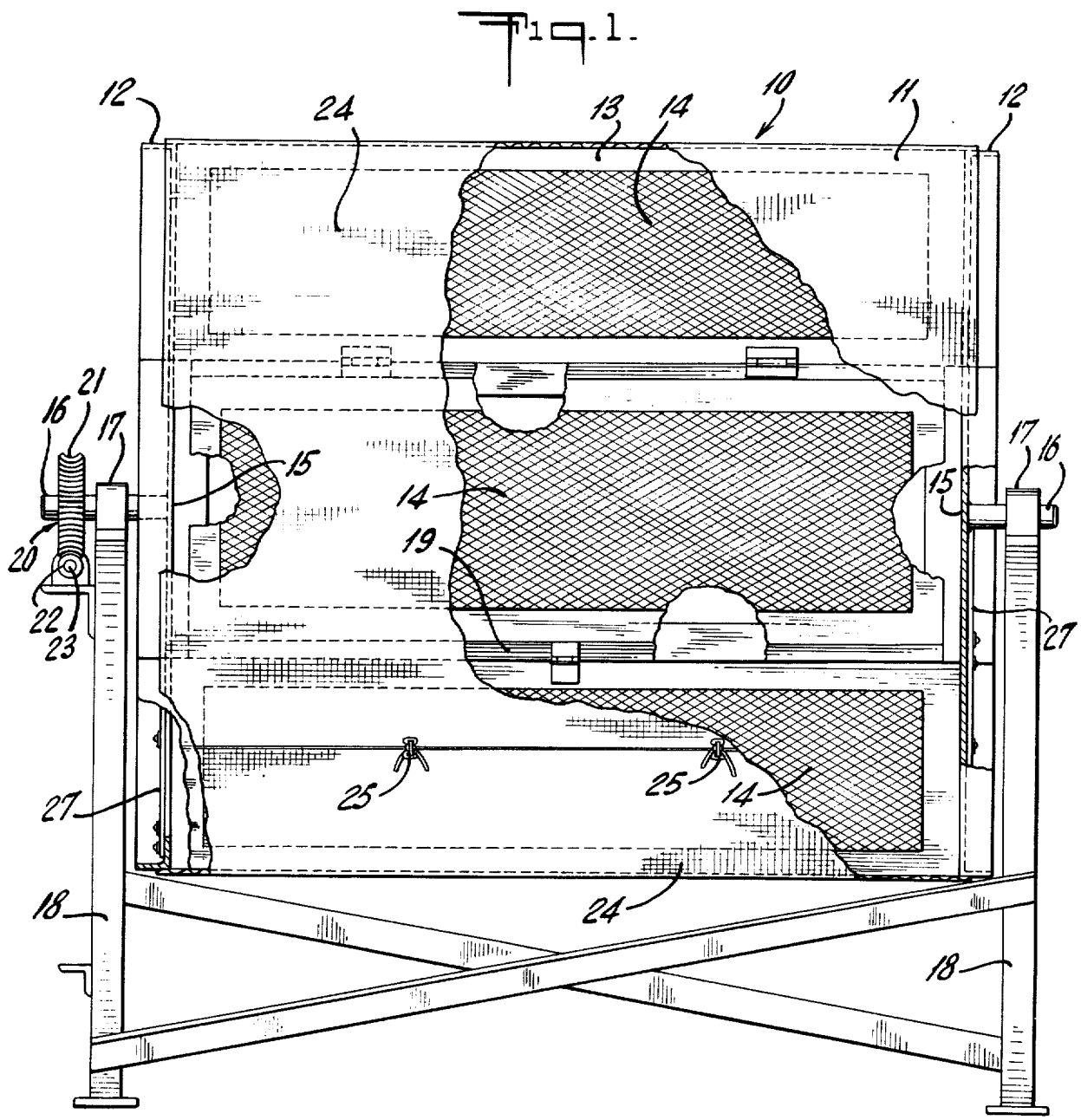
FIG. 1 is a side view of a composting device embodying the invention with portions broken away for purposes of illustration and clarity.

Referring to the drawings in detail, there is a rotatable composting device 10.

In the illustrated embodiment, the composting device 10 is in the form of a free-standing drum-like container or wheel 11 which is supported for rotation about its horizontal axis.

The wheel 11 comprises an open framework having open ends 12 with spaced side bars 13 extending between the ends 12. The bars 13 are spaced outwardly relative to the center of the wheel 11 and extend parallel to the horizontal axis of the wheel 11. The wheel 11 may be of hexagonal shape, as illustrated, or it may be of other suitable shape if desired.

The outer surface of the wheel 11, including its sides and ends, is covered by open-mesh material 14 such as hardware cloth, expanded metal or the like. The open mesh material 14 on the sides of the wheel 11 has a mesh large enough to permit the composted material to be discharged through the open-mesh material 14 as the wheel is rotated. A mesh size of from 1 inch to 1¼ inches will be satisfactory, but a a smaller mesh size may be employed at the ends of the wheel 11.

Supports 15 extend diametrically across each end 12 of the wheel 11 and carry shafts 16 which extend outwardly from each end of the wheel 11. The shafts 16 are journalled in bearings 17 carried by a supporting framework 18. The framework 18 supports the wheel 11 with its exterior or outer periphery clear of the ground and allows the wheel 11 to be rotated as required. The elevation of the wheel 11 prevents access to the wheel 11 by rodents or animals.

An entry door 19 provides access to the interior of the wheel 11 and permits the waste material to be placed in the wheel 11 without difficulty. For convenience, the door 19 may be hinged at one side to a side of the wheel and the door 19 does not need to have an open mesh surface.

A suitable drive mechanism 20 is provided for rotating the wheel as desired. In the drive mechanism 20 illustrated, a worm wheel 21 is carried by one of the shafts 16. The wheel 21 is engaged by a worm gear 22 which is connected to a shaft 23. The shaft 23 is supported by the framework 18 and is turned by a hand crank 23a at its end. It will be understood that other drive means may be employed for rotating the wheel 11.

During the initial or aerobic composting treatment, the open mesh exterior periphery or sides of the wheel 11 are covered by a removable shroud or sheet-like cover 24 of flexible material, such as canvas. The cover 24 may be attached to the ends 12 of the wheel 11 by means of grommets (not shown) or other suitable fastening means with its ends being tied as indicated at 25. The cover 24 keeps the waste material inside the wheel and excludes rain or snow. Thus, the cover 24 aids in controlling the moisture content of the material in the wheel and it also serves to retain heat generated by the decomposition process.

If desired, fertilizers or other chemicals having a high nitrogen content may be added to the organic waste material in the wheel 11 to promote and hasten the treatment. Such additives are well known and form no part of the present invention. In addition, the waste material to be treated may be shredded before it is placed in the wheel 11 to reduce its bulk and size for ease in handling and to expedite the treatment.

During aerobic decomposition, the wheel 11 is rotated periodically with the outer cover 24 in place. The rotation tumbles the material in the wheel 11 which mixes and breaks up the material to increase its exposure to the action of air. This expedites and promotes the decomposition process without the manual labor usually involved in handling material in a compost pile.

When the aerobic treatment or composting of the waste material has been completed, heat is no longer generated by the decomposition process. If desired, the cover 24 can then be removed from the wheel so that the composted material can be discharged through the open mesh material 14 on the sides of the wheel 11 by rotation of the wheel 11.

At the option of the user, anaerobic treatment of the waste material can then be carried out. During the anaerobic treatment, air is excluded from the material in the wheel by placing an inner covering or sheet 26 over the material in the wheel 11 and also by closing the lower segments of each of the ends 12 of the wheel 11 by covers 27. During this treatment, rotation of the wheel is discontinued and the material in the wheel is not disturbed. After both treatments are completed, the inner cover 26 and the outer cover 24 are removed to permit discharge of the composted material as described.

The time required for the aerobic/anaerobic treatment depends on a number of variable factors such as the ambient temperature, the nature and moisture content of the waste material, the chemical additives and the degree to which air is excluded during the anaerobic treatment. Thus, specific times are not indicated for the complete composting treatments. However, when the composting treatments have been completed, the composted material consists of small particles in a loose, friable condition which will pass through the open mesh material 14 on the sides of the wheel 11 when the outer and inner covers 24 and 26 are removed and the wheel 11 is rotated. The discharged material falls onto the ground for collection and use as required.

By allowing part of the composted material to remain in the wheel 11 and adding new waste material to the wheel 11, the remaining material aids in decomposing the newly added material and the composting process may be carried out in a continuous fashion.

It will be understood that various changes and modifications may be made by those skilled in the art in the embodiment of the invention described and illustrated herein without departing from the spirit or scope of the invention.

I claim:

1. The method of composting organic waste material which comprises the steps of:
   a. placing organic waste material in a rotatable container having open mesh sides;
   b. covering the open mesh sides of the container with a removable outer cover of moisture proof material;
   c. periodically rotating the container about a horizontal axis with the cover in place and the waste material therein;
   d. said rotation mixing the material in the container and exposing said material to contact with air;
   e. removing said outer cover and continuing rotation of the container thereby discharging decomposed composted material from the container through the open mesh sides thereof.

2. The method of composting organic waste material which comprises the steps of:
   a. placing organic waste material in a rotatable container having open mesh sides;
   b. covering said open mesh sides of the container with a removable outer cover of moisture excluding material;
   c. periodically rotating the container about a horizontal axis with said outer cover attached and the waste material therein;
   d. said rotation mixing the material in the container and exposing said material to contact with air;
   e. discontinuing said periodic rotation of the container;
   f. placing an inner second cover over the material within the container;
   g. said inner cover directly contacting with the material in the container and preventing air from freely contacting said material;
   h. then removing both said inner and outer covers and continuing rotation of the container with the covers removed;
   i. said continued rotation effecting discharge of composted waste material from the container through the open mesh sides thereof.

3. In a composting device for aerobic and anaerobic decomposition of organic waste materials the combination which comprises:
   a. a rotatable container having an open-mesh material covering its sides;
   b. said open-mesh material having a mesh size permitting decomposed material to be discharged through said mesh upon rotation of the container;
   c. a framework supporting said container at opposite ends thereof for rotation about a horizontal axis;
   d. an entry door in one side of the container for introduction of waste materials into the container;
   e. drive means for rotating the container about its horizontal axis;
   f. a removable protective cover of flexible moisture-proof material surrounding said open-mesh sides of the container and being rotatable therewith;
   g. said protective cover excluding rain and snow while retaining heat generated by decomposition of material within the container and permitting air to contact said material;
   h. a second cover within the container for preventing air from contacting partially decomposed material therein;
   i. said second cover being formed of a flexible material and resting directly on the material in the container.

* * * * *

UNITED STATES PATENT OFFICE
CERTIFICATE OF CORRECTION

Patent No. 3,890,129            Dated June 17, 1975

Inventor(s)      Francis B. Chester

It is certified that error appears in the above-identified patent and that said Letters Patent are hereby corrected as shown below:

Title Page, - first column, line 3 -
"220 East 42nd" should read - 40-28 220th -; line 4 - "10017" should read - 11361 -.

Signed and Sealed this

Twenty-seventh Day of July 1976

[SEAL]

Attest:

RUTH C. MASON
*Attesting Officer*

C. MARSHALL DANN
*Commissioner of Patents and Trademarks*